United States Patent
Mahal et al.

(10) Patent No.: US 7,726,734 B2
(45) Date of Patent: Jun. 1, 2010

(54) JUVENILE SEATING WITH RESILIENT SIDE IMPACT PROTECTION

(75) Inventors: Barry Mahal, York, SC (US); Pankaj Tulsidas Amesar, Charlotte, NC (US); Ronald M. Marsilio, Lake Wylie, SC (US); L. Curtis Strong, Rock Hill, SC (US)

(73) Assignee: Britax Child Safety, Inc., Charlotte, NC (US)

( * ) Notice: Subject to any disclaimer, the term of this patent is extended or adjusted under 35 U.S.C. 154(b) by 0 days.

(21) Appl. No.: 12/256,632

(22) Filed: Oct. 23, 2008

(65) Prior Publication Data

US 2010/0019554 A1 Jan. 28, 2010

Related U.S. Application Data

(60) Provisional application No. 61/082,716, filed on Jul. 22, 2008.

(51) Int. Cl.
*B60N 2/42* (2006.01)
*B60N 2/26* (2006.01)

(52) U.S. Cl. .............................. 297/216.11; 297/250.1

(58) Field of Classification Search ............ 297/216.11, 297/452.41, DIG. 3, 250.1
See application file for complete search history.

(56) References Cited

U.S. PATENT DOCUMENTS

| 3,770,315 | A | * | 11/1973 | Smittle et al. ............ 297/284.6 |
| 4,555,140 | A | * | 11/1985 | Nemoto ................. 297/452.54 |
| 4,611,851 | A | * | 9/1986 | Noyes et al. ................ 297/199 |
| 5,558,398 | A | * | 9/1996 | Santos ...................... 297/284.3 |
| 5,840,400 | A | * | 11/1998 | Landi et al. ................. 428/116 |
| 5,993,276 | A | * | 11/1999 | Ponton et al. ............... 441/130 |
| 6,485,101 | B2 | * | 11/2002 | Kassai et al. ............. 297/250.1 |
| 7,125,073 | B2 | * | 10/2006 | Yoshida .................. 297/216.11 |
| 7,131,701 | B1 | * | 11/2006 | Yang ..................... 297/452.41 |
| 2008/0258518 | A1 | * | 10/2008 | Santamaria ............ 297/216.11 |

* cited by examiner

*Primary Examiner*—Milton Nelson, Jr.
(74) *Attorney, Agent, or Firm*—Adams Intellectual Property Law

(57) ABSTRACT

A child safety seat including a seat bottom and seat back first and second resilient side elements carried on laterally-opposed sides of the seat back, and including walls defining an enclosed chamber. The walls have sufficient rigidity to maintain a nominal shape and are deformable in response to a predetermined minimum impact.

13 Claims, 4 Drawing Sheets

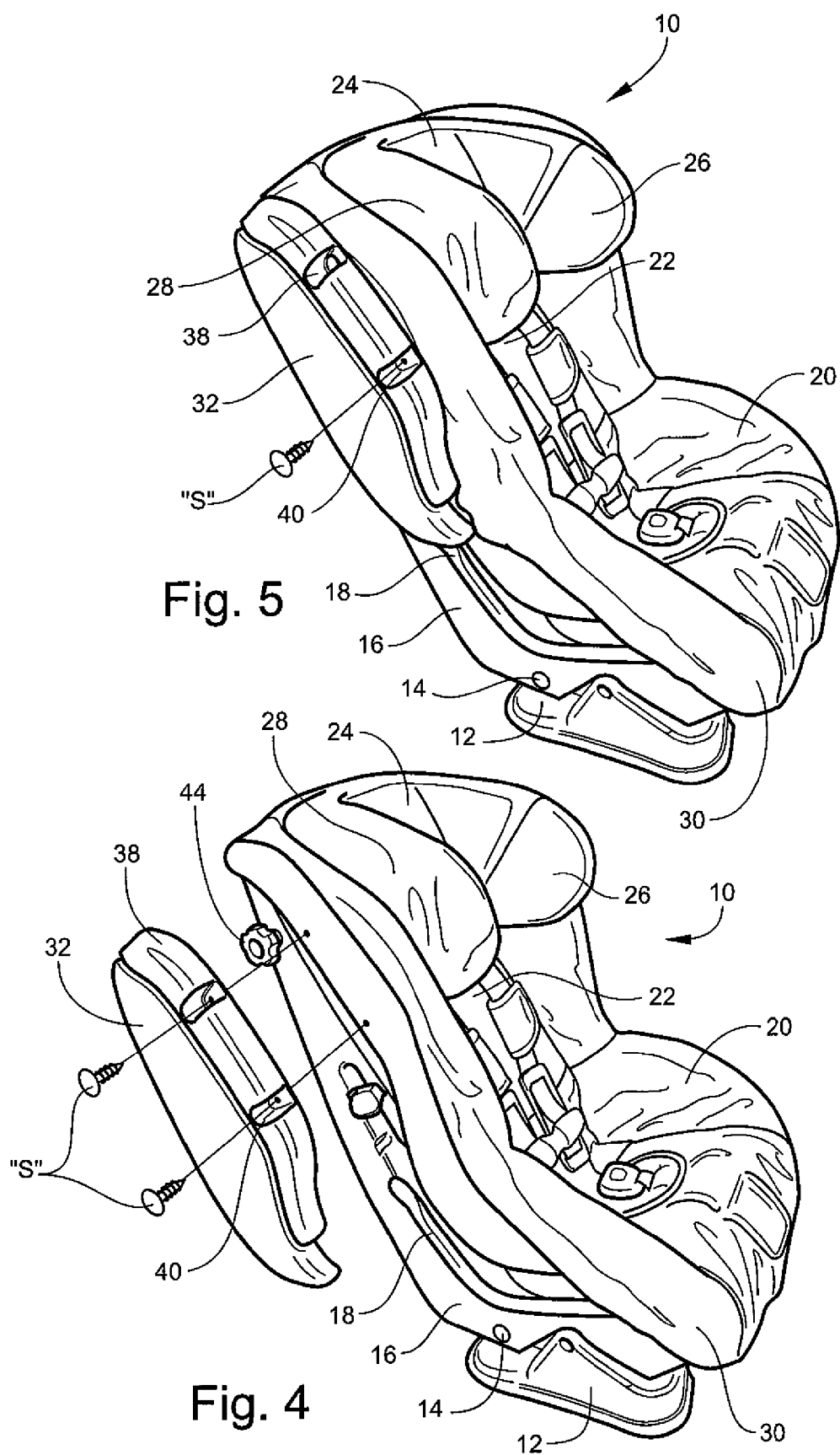

JUVENILE SEATING WITH RESILIENT SIDE IMPACT PROTECTION

PRIORITY CLAIM

This application claims priority to U.S. Provisional Patent Application No. 61/082,716, filed on Jul. 22, 2008.

TECHNICAL FIELD AND BACKGROUND OF THE INVENTION

This invention relates to juvenile seating products that include resilient side elements providing enhanced side impact protection. Such child safety seating products typically have a base that supports a seat on a vehicle seat. The seating products of this type are typically secured to the vehicle seat by the vehicle seat belts, or by a specialized latching device, such as an Isofix latch, carried on the seating product and interfacing with a complementary device carried by the vehicle seat.

While the invention relates broadly to juvenile seating products, it is further described and illustrated in this application with reference to a child safety seat of the type generally described above, it being understood that the invention is not so limited.

Child safety seats typically include a hard plastic shell to which are attach various fittings such as a seat occupant restraint harness and adjusting strap, securing latches, padding and a dress cover. Side torso protection is provided by the combination of the hard shell and the overlying padding. Head protection often includes separate outwardly-projecting side wings on the upper headrest part of the shell that limit the extent of sideways head movement and cushion the limited sideways head movement that does occur.

Head and torso side impact protection is thus provided by the hard plastic of the shell and the overlying protective padding elements. However, impacts sufficient to "bottom out" the outer padding layers can cause severe lateral movement of the entire seat with the potential of wrenching the seat from its anchoring elements and increasing the severity of injury to the seat occupant. Simply adding more and more side padding is not a satisfactory solution, in that it increases the weight, mass and volume of the seat. Increasing the weight and mass of the seat results in greater latent energy stored in the seat, and thus the potential for greater damage in the event of a severe side impact.

Therefore, there is a need for a child safety seat that provides enhanced side impact protection without an increase in weight, mass and volume.

SUMMARY OF THE INVENTION

Therefore, it is an object of the invention to provide a juvenile seating product that includes resilient side impact protection.

It is another object of the invention to provide a juvenile seating product that provides enhanced side impact protection without increased mass, weight and volume.

It is another object of the invention to provide a child safety seat that provides enhanced side impact protection.

It is another object of the invention to provide a child safety seat that includes resilient side components that cooperate with conventional padding elements to provide enhanced side impact protection.

These and other objects and advantages are achieved by providing a child safety seat, comprising a seat frame including a seat bottom and seat back, and first and second resilient side elements carried on laterally-opposed sides of the seat back, and comprising walls defining an enclosed chamber, the walls having sufficient rigidity to maintain a nominal shape and deformable in response to a predetermined minimum impact.

In accordance with one embodiment of the invention, the chamber is adapted to contain air, and includes an air flow opening in the walls adapted to allow air flow communication with between the chamber and surrounding ambient air.

In accordance with another embodiment of the invention, the opening includes a valve for restricting the rate of flow of air from the chamber in response to a deforming impact against the side element.

In accordance with another embodiment of the invention, the side elements are shaped to generally conform to adjacent side contours of the seat back.

In accordance with another embodiment of the invention, each side element is mounted to the seat back with at least one mechanical fastener, and the least one mechanical fastener is mounted to the seat back through the air flow opening.

In accordance with another embodiment of the invention, the side elements are blow-molded.

In accordance with another embodiment of the invention, the walls are formed of a blow-moldable material selected from the group consisting of polypropylene (PP), ethylene vinyl acetate (EVA), low or high density polyethylene (LDPE, HDPE) and polystyrene (PS).

In accordance with another embodiment of the invention, walls have a thickness of between about 0.070 inches and about 0.090 inches.

In accordance with another embodiment of the invention, a child safety seat is provided, comprising a base to which is mounted a seat an integrally-formed seat bottom and seat back, first and second resilient side elements carried on laterally-opposed sides of the seat back, and walls defining an enclosed air chamber, the walls having sufficient rigidity to maintain a nominal shape and deformable in response to a predetermined minimum impact. An air flow opening is provided in the walls of the chamber and is adapted to allow air flow communication with between the chamber and surrounding ambient air at a restricted rate for allowing a controlled release of air from the chamber in response to a deforming impact against the side element.

In accordance with another embodiment of the invention, the chamber contains a compressible open-cell foam material.

In accordance with another embodiment of the invention, a valve is provided for restricting the rate of flow of air from the chamber in response to a deforming impact against the side element.

In accordance with another embodiment of the invention, the side elements are shaped to generally conform to adjacent side contours of the seat back.

In accordance with another embodiment of the invention, a pressurized gas is contained within the chamber for providing controlled resistance to deformation of the side elements in response to a predetermined minimum impact.

According to another embodiment of the invention, a child safety seat is provided and includes a seat frame including a seat bottom and seat back and first and second resilient side elements carried on laterally-opposed sides of the seat back. The resilient side elements include walls defining an enclosed chamber, the walls defining a predetermined volume. An air flow device is provided in the walls adapted to allow air flow communication between the chamber and surrounding ambient air upon an impact causing a change in the predetermined volume of the enclosed chamber.

BRIEF DESCRIPTION OF THE DRAWINGS

Some of the objects of the invention have been set forth above. Other objects and advantages of the invention will appear as the description of the invention proceeds when taken in conjunction with the following drawings, in which:

FIG. 4 is an exploded perspective view of a side impact element and child safety seat;

FIG. 5 is a partially-exploded view showing the side impact element attached to the side of the child safety seat.

DESCRIPTION OF THE PREFERRED EMBODIMENTS AND BEST MODE

Figure 1:
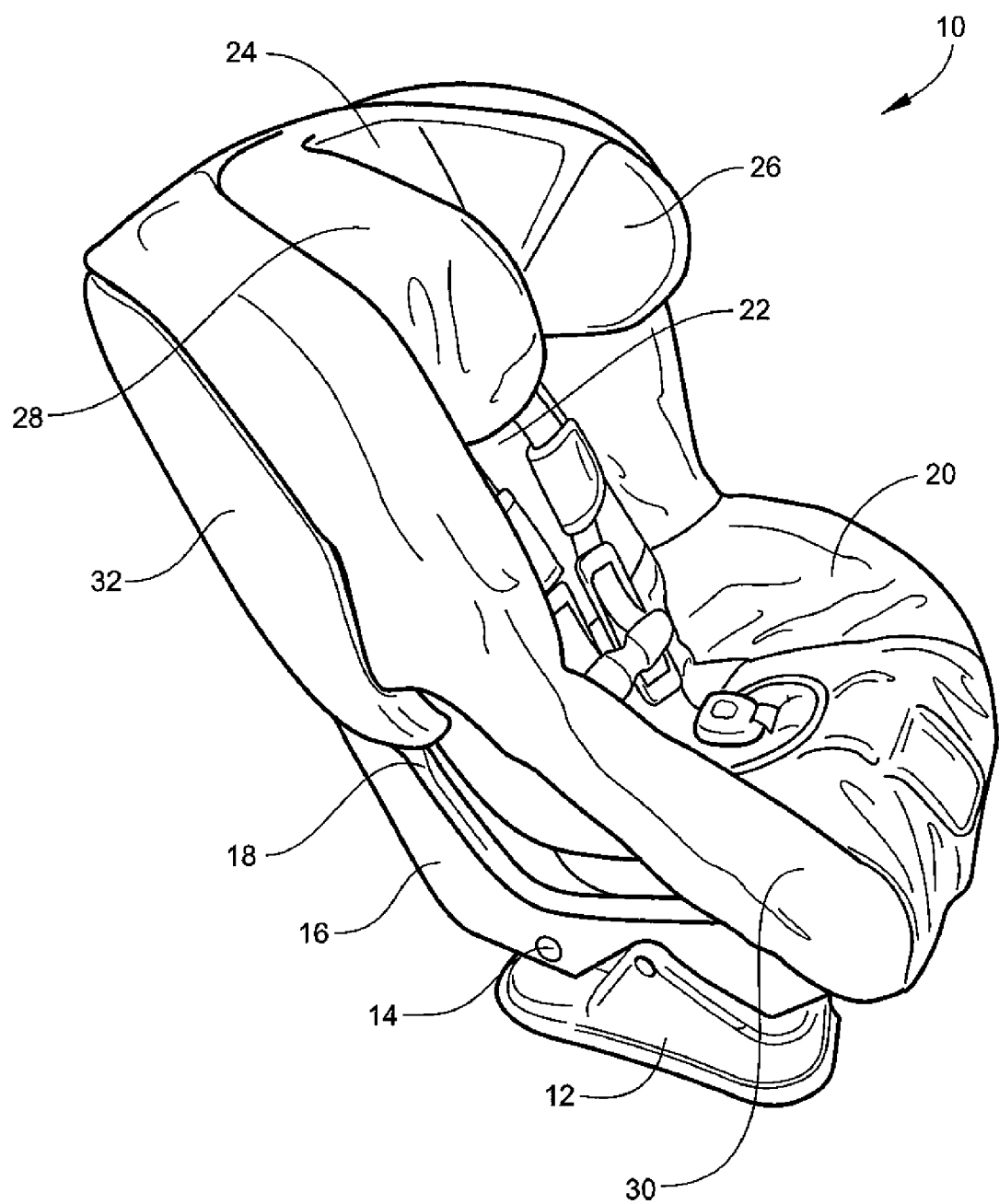
FIG. 1 is a perspective view of a child safety seat including resilient side impact protection, with outer padding being partially removed from over the resilient elements.

Referring now specifically to the drawings, a child safety seat according to the present invention is shown generally in FIG. 1 at reference numeral 10. The seat 10 includes a base 12 which is mounted by a pivot 14 to a rigid plastic shell 16. A bar 18 that carries a latching mechanism, not shown, is secured to the shell. A like bar, not shown, is carried by the opposite side of the shell 16.

The shell 16 forms the seating element per se of the seat 10, and includes an integral seat bottom 20, a seat back 22 and a headrest 24. Separate outwardly-projecting side wings 26, 28 on the upper headrest part of the shell 16 limit the extent of sideways head movement and cushion the limited sideways head movement that does occur. Substantially all of the seat bottom 20, seat back 22 and headrest 24 are covered by a padded dress cover 30 that provides a comfortable seating surface for the seat occupant.

Figure 2:
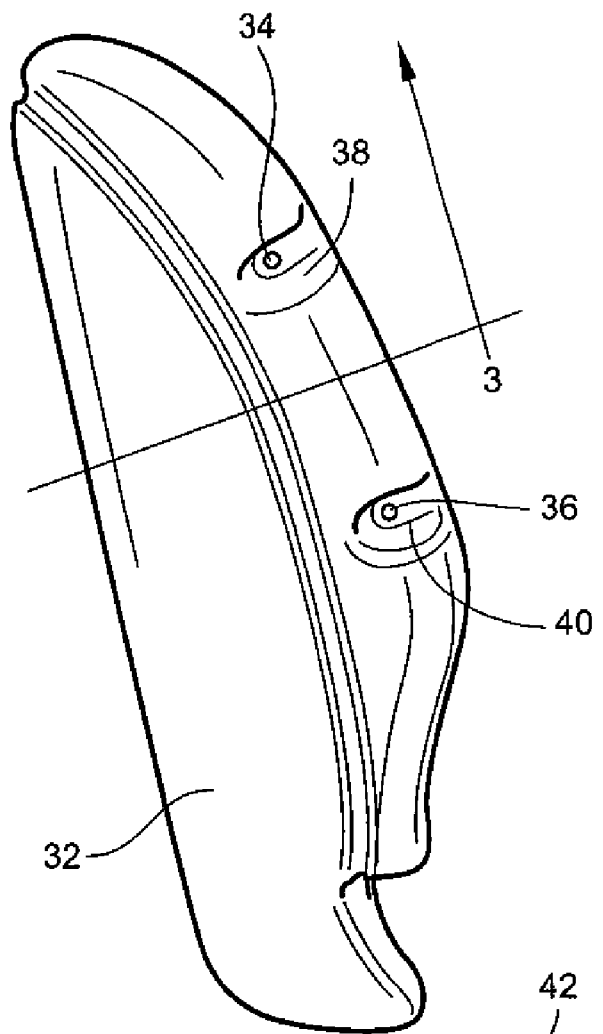
FIG. 2 is a perspective view of a side impact element according to an embodiment of the invention.

Typical prior art child safety seats include side padding overlying the opposite outer sides of the shell. In contrast, seat 10 includes a pair of resilient side elements one of which is shown at reference numeral 32 in FIG. 2 of the drawings. The other resilient side element is positioned on the opposite side of the shell and is a mirror image to the side element 32 in FIG. 2. When properly in place, the resilient side elements are covered by the dress cover 30.

Resilient side element 32 is preferably formed of a suitable blow-moldable polymer, such as polypropylene (PP), ethylene vinyl acetate (EVA), low or high density polyethylene (LDPE, HDPE) or polystyrene (PS). In a preferred embodiment, LDPE is used to form the resilient side element 32. One example of a preferred LDPE is Petrothene® NA362 manufactured by Equistar Chemicals, LP out of Houston, Tex.

In an preferred embodiment, the resilient side element 32 is formed by extrusion blow molding. Blow molding begins with melting down the polymer and forming into a parison or preform. The parison is clamped into a mold shaped to form the outer dimensions of the side element 32 and air is pumped into the mold. Air pressure pushes the plastic of the parison outwardly and into conformation with the inner walls of the mold. Once the plastic has cooled and hardened, the mold opens up and the part is ejected. Suitably positioned mold plugs provide attachment holes 34, 36 and the like. In the embodiment shown in FIGS. 2 and 3, the side element 32 also includes recesses 38, 40 within which the attachment holes 34, 36 are positioned, and a larger recess 42 allowing hand access to a headrest adjustment knob 44 is shown in FIG. 4.

Figure 3:
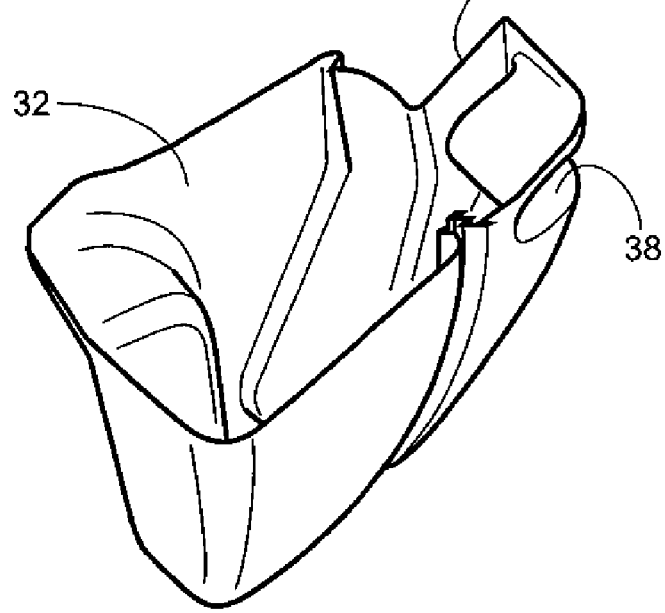
FIG. 3 is a lateral cross-section of the side impact element shown in FIG. 3.

The molded side element 32 preferably has a wall thickness range of about 0.070 to about 0.090 inches, and the outer surface skins over to form a relatively smooth outer surface having a texture dictated by the texture on the inner wall of the mold. A limited amount of foaming may occur to provide greater wall thickness without increasing weight. In a preferred embodiment, no foaming takes place and the side element 32 is a hollow blow-molded element. The side element 32 is preferably hollow, as shown in FIG. 3, and has sufficient rigidity to maintain its nominal shape except when subjected to more than a predetermined minimum amount of impact.

Referring to FIGS. 4 and 5, the molded side element 32 is preferably attached to the shell 16 by means of a pair of large screws "S." Attachment may be by any suitable means, and may be by fixed attachment means such as adhesives or one-way bolts, or by removable attachment means such as the screws "S", clips, slide mounts or the like.

The particular embodiment of the side element 32 shown in FIGS. 4 and 5 covers and provides side impact protection to the seat back 22 and headrest 24 parts of the seat 10, but side elements in accordance with the invention may be placed at any position along the side of the shell 16, and may be a single side element that covers the entire desired extent of the shell, or two or more separate side element components that collectively provide the desired protection. The resilient side element 32 may be any suitable shape including the elongated shape shown throughout the figures, or may be a diamond, squared, or generally round shape.

Figure 6:
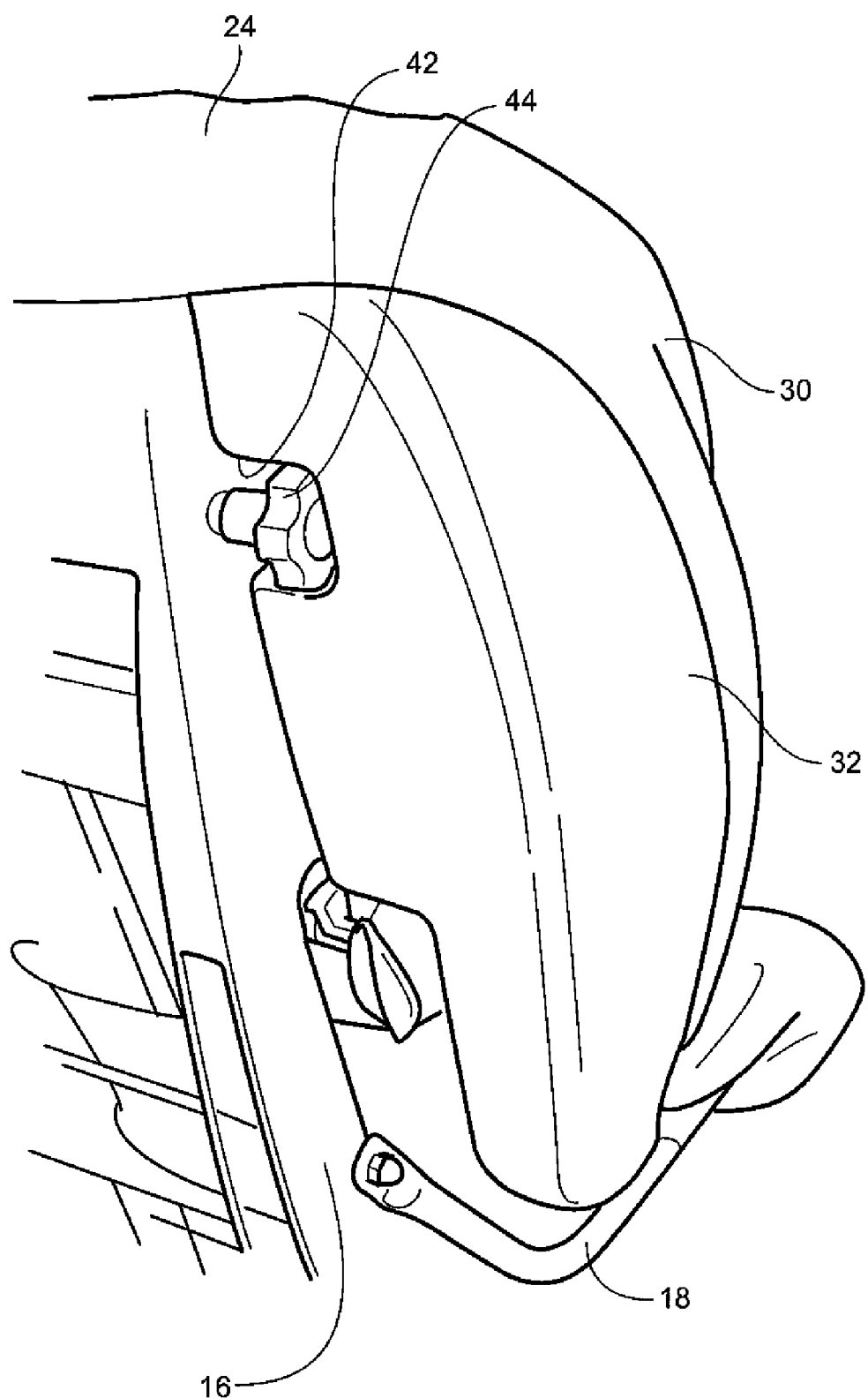
FIG. 6 is a rear perspective view showing attachment of the side impact element and the recess that accommodates a headrest adjustment knob.

If the preferred hollow side element 32 is utilized, controlled venting of air within the side element 32 upon impact is desirable to prevent rupture, and may be provided by vents, not shown, or by allowing leakage around the screw holes 34, 36. Alternatively, side elements of foamed material may be used, or hollow elements filled with a supplemental impact material such as PE or PS beads or fibers, gels, or liquids. In additional, a hollow side element pressurized with a gas may also be used. As shown in FIG. 6, the side element 32 and the recess 42 allow hand access to the headrest adjustment knob 44.

Alternative fabrication methods include rotationally-molding the side elements, or heat sealing two or more molded elements together to form a hollow or foamed side element.

The following example provides one preferred embodiment of the invention:

Resilient side element 32 is formed by extrusion blow molding using NA362 low density Petrothene®. The Petrothene® is melted and then forced into the preferred mold shape forming the shape of the resilient side element 32. The mold is then cooled to form a solid shape conforming to the resilient side element 32. The resilient side element 32 is then ejected from the mold. The resilient side element 32 is then secured to the seat 10 by a series of attachment screws.

A series of compressive force testing was performed on the resilient side elements 32. In this preferred embodiment, the resilient side elements 32 are formed from NA-362 low density Petrothene®. No re-grind plastic material is used in the base resin or pigment carrier and release agents (e.g. silicones) are not used. The resilient side elements 32 have a width of approximately 6.5 inches, a height of approximately 18 inches, and a depth of approximately 3 inches. The screw holes 34, 36 have a diameter of approximately 0.3 inches. In the experimental testing, compressive forces were applied to a side of the resilient side element 32 and deflection of each resilient side element 32 was measured. In each testing, the resilient side element 32 always returned to its nominal shape after compression.

| Force (lbs) | Deflection (in) |
|---|---|
| 0.00 | 0.000 |
| 25.00 | 0.137 |
| 50.00 | 0.282 |
| 75.00 | 0.757 |
| 100.00 | 1.271 |
| 125.00 | 1.555 |
| 150.00 | 1.678 |
| 175.00 | 1.789 |
| 200.00 | 1.928 |
| 225.00 | 2.011 |
| 250.00 | 2.091 |

A child safety seat having resilient side elements is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

We claim:

1. A child safety seat, comprising:
    (a) a seat frame including a seat bottom, a seat back and a headrest;
    (b) first and second elongate, resilient impact-resisting side elements positioned outboard of respective laterally-opposed sides of the seat back and headrest, the first and second impact-resisting side elements extending from proximate respective laterally-opposed sides of the headrest to a position proximate a seating surface of the seat bottom, and comprising walls defining a unitary chamber having an interior volume;
    (c) an air flow opening in the walls of the chamber for permitting air flow communication between the interior volume of the chamber and surrounding ambient air;
    (d) the resilient side elements having a wall thickness and construction permitting deformation of the side elements at a controlled rate in response to a side impact; and
    (e) wherein each side element is mounted to the seat back with at least one mechanical fastener, and further wherein the at least one mechanical fastener is mounted to the seat back through the air flow opening.

2. The child safety seat according to claim 1, wherein the side elements are blow-molded.

3. The child safety seat according to claim 2, wherein the walls are formed of a blow-moldable material selected from the group consisting of polypropylene, ethylene vinyl acetate, low or high density polyethylene and polystyrene.

4. The child safety seat according to claim 1, wherein the side elements are shaped to generally conform to adjacent side contours of the seat back.

5. The child safety seat according to claim 1, wherein the walls have a thickness of between about 0.070 inches and about 0.090 inches.

6. A child safety seat, comprising: A child safety seat, comprising:
    (a) a base to which is mounted a seat having an integrally-formed seat bottom, a seat back, and a headrest;
    (b) first and second elongate, resilient impact-resisting side elements positioned outboard of respective laterally-opposed sides of the seat back, each of the first and second elongate, resilient impact-resisting side elements extending from proximate respective laterally-opposed sides of the headrest to a position proximate a seating surface of the seat bottom and comprising walls defining an enclosed air chamber, the walls having sufficient rigidity to maintain a nominal shape and deformable in response to a predetermined minimum impact;
    (c) an air flow opening in the walls of the chamber adapted to allow air flow communication between the chamber and surrounding ambient air at a restricted rate for allowing a controlled release of air from the chamber in response to a deforming impact against the side element, and
    (d) wherein each side element is mounted to the seat back with at least one mechanical fastener, and further wherein the at least one mechanical fastener is mounted to the seat back through the air flow opening.

7. The child safety seat according to claim 6, wherein the walls have a thickness of between about 0.070 inches and about 0.090 inches.

8. The child safety seat according to claim 6, wherein a pressurized gas is contained within the chamber for providing controlled resistance to deformation of the side elements in response to a predetermined minimum impact.

9. The child safety seat according to claim 6, wherein the chamber contains a supplemental impact material selected from the group consisting of polyethelyne or polystyrene beads, fibers, gels, or liquids.

10. The child safety seat according to claim 6, wherein the chamber contains a compressible open-cell foam material.

11. The child safety seat according to claim 6, wherein the walls are formed of a blow-moldable material selected from the group consisting of polypropylene, ethylene vinyl acetate, low or high density polyethylene and polystyrene.

12. The child safety seat according to claim 6, wherein the side elements are shaped to generally conform to adjacent side contours of the seat back.

13. The child safety seat according to claim 6, wherein the side elements are blow-molded.

\* \* \* \* \*